(12) United States Patent
Oda

(10) Patent No.: US 7,496,371 B2
(45) Date of Patent: Feb. 24, 2009

(54) PORTABLE TERMINAL AND PORTABLE TERMINAL COMMUNICATION METHOD

(75) Inventor: Toshiyuki Oda, Tokyo (JP)

(73) Assignee: NEC Corporation, Tokyo (JP)

( * ) Notice: Subject to any disclaimer, the term of this patent is extended or adjusted under 35 U.S.C. 154(b) by 403 days.

(21) Appl. No.: 11/297,963

(22) Filed: Dec. 9, 2005

(65) Prior Publication Data
US 2006/0128450 A1 Jun. 15, 2006

(30) Foreign Application Priority Data
Dec. 10, 2004 (JP) ............................... 2004-358589

(51) Int. Cl.
*H04Q 7/20* (2006.01)
(52) U.S. Cl. ............... 455/457; 455/456.1; 455/562.1; 455/575.5; 455/575.7; 455/115.3
(58) Field of Classification Search ............... 455/436, 455/439, 452.2, 67.13, 115.3, 115.4
See application file for complete search history.

(56) References Cited

U.S. PATENT DOCUMENTS

| | | | | |
|---|---|---|---|---|
| 6,330,438 | B1* | 12/2001 | McClelland et al. | ........ 455/421 |
| 2003/0119460 | A1* | 6/2003 | Zipper | ........................ 455/115 |
| 2004/0152419 | A1 | 8/2004 | Lee | |
| 2004/0235421 | A1* | 11/2004 | Matsuoka et al. | .......... 455/63.4 |

FOREIGN PATENT DOCUMENTS

| EP | 1 381 173 | 1/2004 |
|---|---|---|
| EP | 1 458 123 | 9/2004 |
| JP | 2000-134131 | 5/2000 |
| JP | 2002-135023 | 5/2002 |
| JP | 2002-290544 | 10/2002 |
| JP | 2003-264417 | 9/2003 |

OTHER PUBLICATIONS

European Search Report and Search Opinion, European Patent Application No. 05111628.3, dated Jul. 23, 2007.

* cited by examiner

*Primary Examiner*—Alexander Eisen
*Assistant Examiner*—Dai A Phuong
(74) *Attorney, Agent, or Firm*—Michael Best & Friedrich LLP

(57) ABSTRACT

There are provided: a main receiving unit for receiving incoming signals from a base station via a main antenna provided in a portable terminal; sub receiving units for receiving incoming signals from the base station via a plurality of detection antennas provided in the portable terminal; a detection unit for detecting the arriving direction of base station signals in the radio wave environment of the portable terminal based on receiving level information of the main antenna, on receiving level information of the detection antennas and on directivity information of the detection antennas; and notifying units for notifying information about the arriving direction of the base station signals detected by the detection unit.

10 Claims, 8 Drawing Sheets

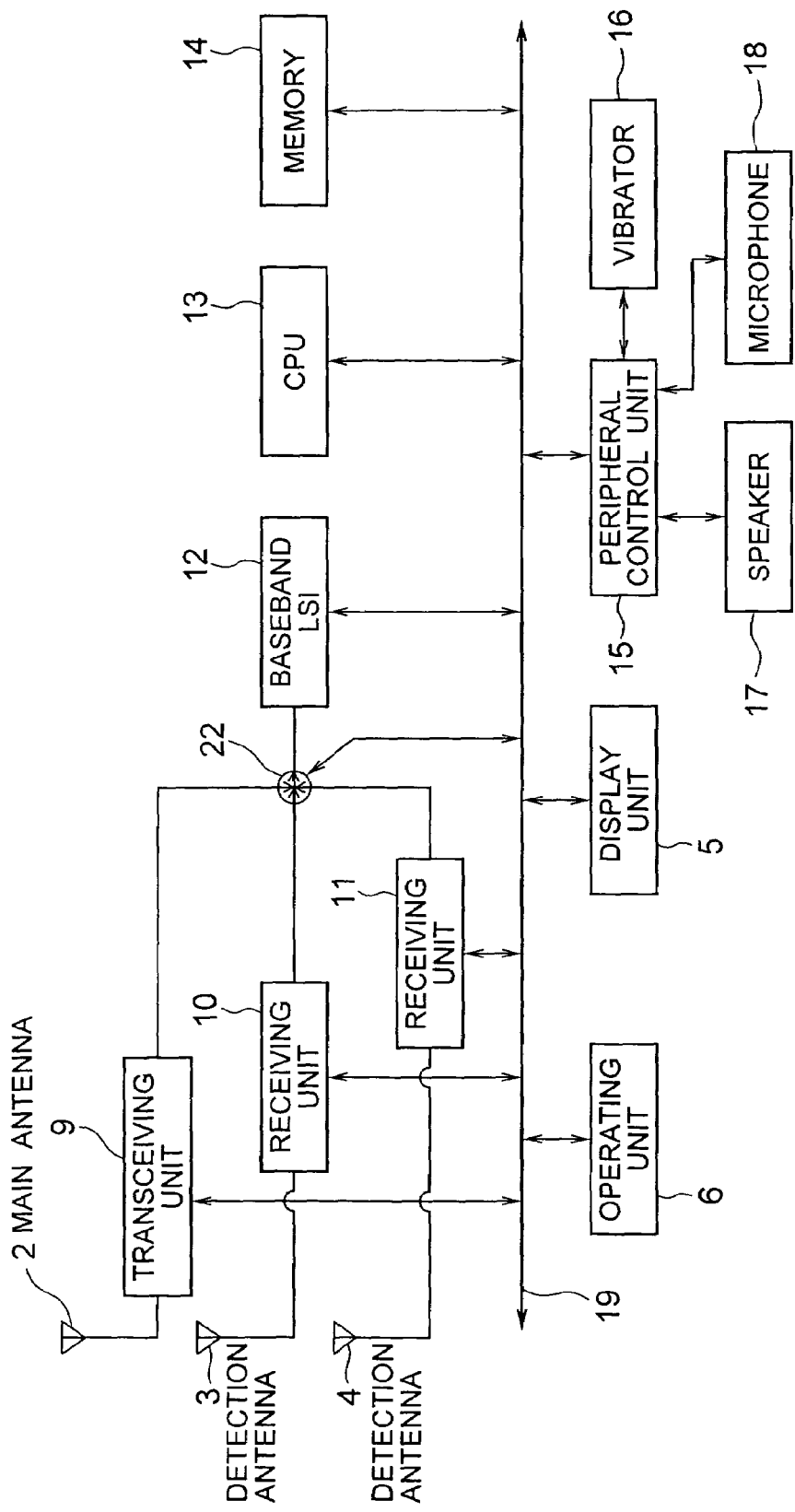

PORTABLE TERMINAL AND PORTABLE TERMINAL COMMUNICATION METHOD

CROSS-REFERENCE TO RELATED APPLICATIONS

This application claims priority of Japanese Patent Application No. 2004-358589, filed Dec. 10, 2004.

BACKGROUND OF THE INVENTION

1. Field of the Invention

The present invention relates to a portable terminal and a portable terminal communication method for performing communications while minimizing deterioration of the communication quality even in a case where a radio wave environment is in a deadlock.

2. Related Art

There are mobile telephones including a plurality of antennas so as to have the diversity effect.

A base station transmits radio waves in a service area, and forms a call channel between it and a mobile telephone by using the radio waves. The radio waves transmitted from the base station have strong directivity, so the receiving condition in the mobile telephone may fluctuate depending on the arriving direction of the radio waves.

On the other hand, when explaining a mobile telephone, a mobile telephone is formed in an elongated shape which is conveniently portable, so that a user can easily hold it with one hand. In a mobile telephone, a receiver is built in at one end of the elongated phone body, and an antenna is incorporated in the other end on the opposite side. This arrangement is defined so as to prevent radio waves transmitted/received from/by the antenna from affecting bad influence on the user for example.

In view of the characteristics of a mobile telephone described above, a part of the antenna incorporated in the mobile telephone is covered with a hand of the user (derivative) when he/she takes a position of calling or creating an e-mail or the like, whereby the antenna characteristics are changed.

As described above, when the antenna incorporated in the mobile telephone is covered with a hand of the user, or when the direction of the antenna incorporated in the mobile telephone is inappropriate with respect to the arriving direction of radio waves from the base station, the receiving characteristics of the antenna are deteriorated. In such a case, if the arriving direction of radio waves from the base station is only the deteriorated direction, the incoming call rate may be deteriorated significantly.

Conventionally, in order to prevent the incoming call rate in a mobile telephone from being deteriorated even in a case where the arriving direction of radio waves from the base station is only the deteriorated direction, a sub antenna is provided with a function same as that of the main antenna so as to be switched to one having a better receiving level (see, for example, Japanese Patent Application Laid-Open No. 2002-135023 and Japanese Patent Application Laid-Open No. 2003-264417).

In the method adopted conventionally as described above, a sub antenna is required to have a function same as that of the main antenna. Therefore, the number of components built in a mobile telephone increases. Along with it, the weight of the mobile telephone becomes heavier, and a mounting space required for mounting the components within the mobile telephone must be increased. This means a certain sacrifice must be made in the characteristics of a mobile telephone, so there has been a problem that a negative element is caused to the merchantability of a mobile telephone.

SUMMARY OF THE INVENTION

It is therefore an object of the present invention to provide a portable terminal and a portable terminal communication method, for detecting the arriving direction of radio waves even in a state where the receiving characteristics are deteriorated, notifying a user of the information, and urging the user to change the direction of the mobile telephone to a direction of better receiving conditions, by using a sub antenna as an antenna dedicated for detecting arrival of radio waves.

In order to achieve the above-mentioned object, a portable terminal according to the present invention comprises: a main receiving unit for receiving incoming signals from a base station via a main antenna provided in the portable terminal; a sub receiving unit for receiving incoming signals from the base station via a plurality of detection antennas provided in the portable terminal; a detection unit for detecting the arriving direction of base station signals in the radio wave environment of the portable terminal, based on receiving level information of the main antenna, receiving level information of the detection antennas, and directivity information of the detection antennas; and a notifying unit for notifying information about the arriving direction of the base station signals detected in the detection unit. The plurality of detection antennas are arranged such that directions of the directivities thereof are differed.

In performing communications by using the portable terminal according to the present invention, incoming signals from a base station are received by the main antenna provided in the portable terminal, and the incoming signals from the base station are received by a plurality of detection antennas provided in the portable terminal. Then, based on receiving level information of the main antenna, receiving level information of the detection antennas and directivity information of the detection antennas, the arriving direction of the base station signals in the radio wave environment of the portable terminal is detected. Information about the arriving direction of the base station signal detected is notified as needed.

The notifying unit notifies the information about the arriving direction of the base station signals together with the receiving level information as needed. Further, the detection unit detects the arriving direction of the base station signals in the radio wave environment of the portable terminal based on differential information in which the receiving level of the main antenna is lowered with respect to the receiving level of the detection antenna, and on directivity information of the direction antennas.

Further, if the differential information is not more than a threshold, the notifying unit notifies the information about the arriving direction of the base station signal together with the receiving level information. If the differential information is not less than the threshold, the notifying unit performs display of an electric field level of the base station signal instead of the notification.

The notifying unit may notify the information by vibrating the portable terminal body, notify the information as audio information, or notify the information as visual information.

EFFECTS OF THE INVENTION

As described above, according to the present invention, the arriving direction of radio waves from a base station is detected and the information is notified to a user so as to urge the user to change the direction of the portable terminal to a direction of a good receiving condition. Thereby, even in a case where the radio wave environment is in a deadlock, it is possible to perform communications while suppressing the deterioration of the communication quality to the minimum.

Further, according to the present invention, detection antennas provided in addition to the main antenna are used only for detecting the arriving detection of radio waves while allowing the receiving performance to be degraded. Therefore, the negative merchantability of a portable terminal caused due to the addition of the detection antennas for detecting the arriving detection can be suppressed to the minimum, and a light-weight, small portable terminal can be realized. Further, the receiving characteristics are also secured.

BRIEF DESCRIPTION OF THE DRAWINGS

FIG. 2 is a block diagram showing the configuration of a portable terminal according to the present invention;

DESCRIPTION OF THE PREFERRED EMBODIMENTS

Hereinafter, embodiments of the present invention will be explained with reference to the drawings.

A portable terminal according to an embodiment of the present invention includes, as the basic configuration: a main receiving unit for receiving incoming signals from a base station via a main antenna provided in the portable terminal; a sub receiving unit for receiving incoming signals from the base station via a plurality of detection antennas provided in the portable terminal; a detection unit for detecting the arriving direction of the base station signals in the radio wave environment of the portable terminal based on receiving level information of the main antenna, receiving level information of the detection antenna, and directivity information of the detection antenna; and a notifying unit for notifying information about the arriving direction of the base station signals detected by the detection unit.

Incoming signals from the base station are received by the main antenna provided in the portable terminal, and are received by the plural detection antennas provided in the portable terminals. Then, based on the receiving level information of the main antenna, the receiving level information of the detection antennas, and the directivity information of the detection antennas, the arriving direction of the base station signals in the radio wave environment of the portable terminal is detected. Further, information about the arriving direction of the base station signals detected is notified.

Next, the embodiment of the present invention will be explained specifically. In the explanation below, a case of using a mobile telephone as a portable terminal is explained. However, a portable terminal is not limited to a mobile telephone. That is, any portable terminal in which information is transmitted/received by using a radio wave channel via antennas is acceptable.

Figure 1A:
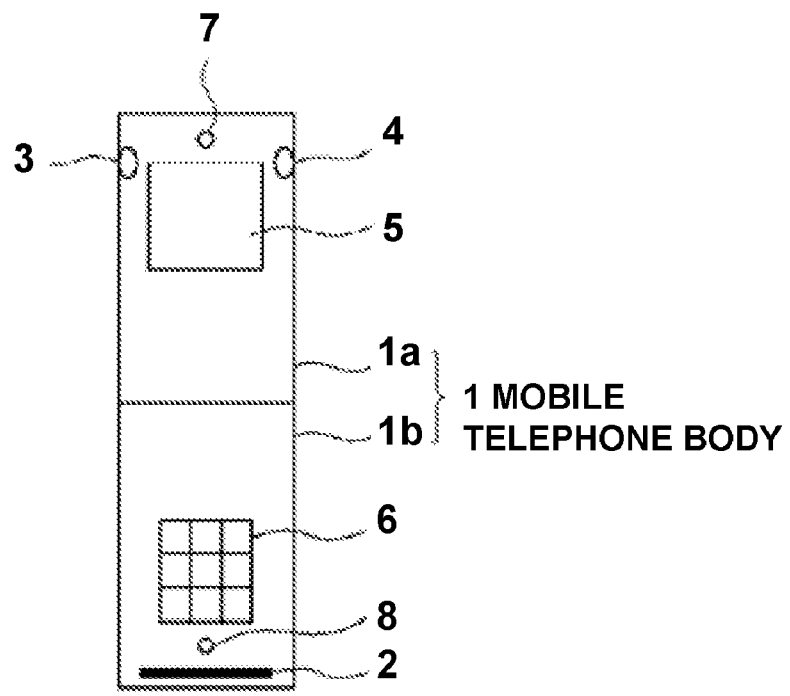
FIG. 1A is a front view showing a portable terminal according to one embodiment of the present invention.

As shown in FIG. 1A, a mobile telephone as a portable terminal according to the embodiment of the present invention includes, in the mobile telephone body 1, one main antenna 2 and two detection antennas 3 and 4.

The mobile telephone body 1 shown in FIG. 1A is divided into two cases 1a and 1b at the almost center thereof, and the divided cases 1a and 1b are connected openably/closably with a hinge not shown. One case 1a incorporates a display unit 5, and the other case 1b incorporates an operating unit 6. In the mobile telephone body 1, the two cases 1a and 1b are folded into two when an incoming call is waited.

Figure 5A:
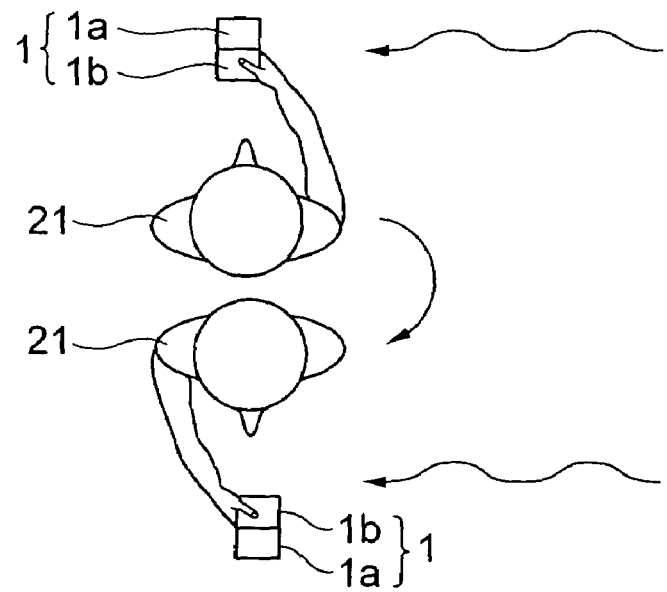
FIG. 5A is a plan view showing a state where a user is changing the direction of a portable terminal.

One case 1a incorporates a receiver 7, and the other case 1b incorporates a transmitter 8. In the case 1b of the transmitter 8 side, the main antenna 2 is incorporated, and in the case 1a of the receiver 7 side, the two detection antennas 3 and 4 are mounted separately on the right and left across the display unit 5. Generally, when a user 21 takes a communicating position for calling, creating an e-mail or the like, the user 21 is likely to operate the mobile telephone by holding the case 1b of the mobile telephone body 1 as shown in FIG. 5A. Therefore, the antenna 2 incorporated in the case 1b of the mobile telephone body 1 is likely to be covered with a hand of the user 21, so the antenna characteristics are subject to deterioration. On the other hand, the case 1a of the mobile telephone body 1 is seldom covered by a hand of the user 21 because of the characteristics of the mobile telephone, and since the detection antennas 3 and 4 are incorporated in the case 1a of the portable telephone body 1, deterioration in the antenna characteristics due to operation of the mobile telephone is not caused. For the detection antennas 3 and 4, telescopic antennas are used so as not to affect carrying of the mobile telephone.

Further, as shown in FIG. 2, the cases 1a and 1b of the mobile telephone body 1 incorporate a transceiving unit 9, two receiving units 10 and 11, a baseband LSI 12, a CPU 13, a memory 14, a peripheral control unit 15, a vibrator 16, a speaker 17, and a microphone 18. The CPU 13 is connected with the display unit 5, the operating unit 6, the transceiving unit 9, the two receiving units 10 and 11, the baseband LSI 12, the memory 14, a changeover switch 22 and the peripheral control unit 15 via a bus 19.

The transceiving unit 9 is connected with the main antenna 2, and at the time of reception, it receives radio waves from the base station via the main antenna 2, and at the time of transmission, it transmits information from the main antenna to the base station. The two receiving units 10 and 11 receive radio waves from the base station via the detection antennas 3 and 4, respectively. The changeover switch 22 selects the transceiving unit 9 or the receiving unit 10 or 11 so as to connect it to the baseband LSI 12. The transceiving unit 9 transmits and receives information to/from the base station via the main antenna 2. On the other hand, the detection antennas 3 and 4 do not transmit and receive information to/from the base station, but are used only for detecting the arriving direction of radio waves from the base station. Therefore, the performance of the receiving units 10 and 11, used corresponding to the detection antennas 3 and 4, is not required to have the same performance as that of the transceiving unit 9, so the outer dimension may be reduced in size comparing with that of the transceiving unit 9. Accordingly, it is possible to prevent an increase in size of the portable telephone body 1 by adding the receiving units 10 and 11.

Figure 5B:
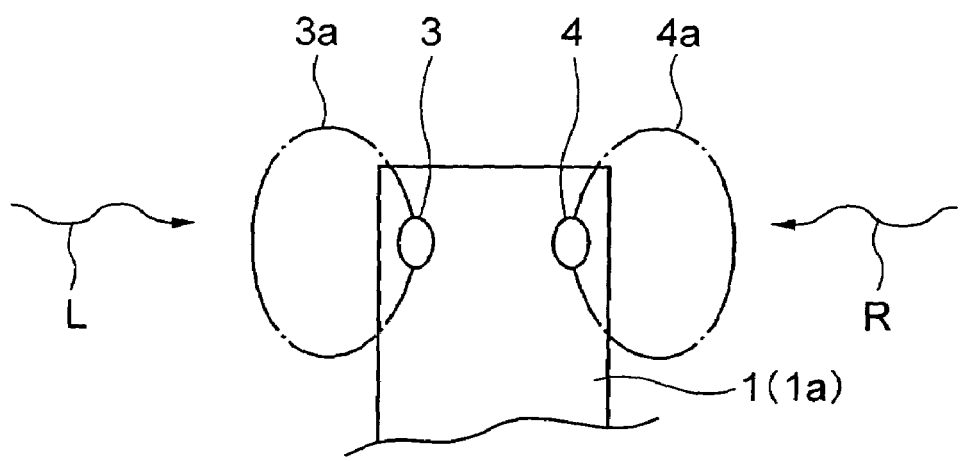
FIG. 5B is a diagram showing the directions of the directivities of detection antennas.

Further, the detection antennas 3 and 4 are arranged such that the directivities thereof are differed. More specifically, in the present embodiment, the two detection antennas 3 and 4 are used. As shown in FIG. 5B, the two detection antennas 3 and 4 are mounted on the left and right, with a space between them, of the mobile telephone body 1, and are arranged such that the directivities 3a and 4a thereof are in the different directions of left and right of the mobile telephone body 1. Therefore, the detection antenna 4 on the right side of FIG. 5B shows high receiving sensitivity with respect to radio waves R from the base station incoming from the right side of the mobile telephone body 1. In contrast, the detection antenna 3 on the left side of FIG. 5B shows high receiving sensitivity with respect to radio waves L from the base station incoming from the left side of the mobile telephone body 1. Based on the directivity information of the antennas 3 and 4, it is possible to detect the arriving direction of radio waves with respect to the mobile telephone body 1.

In the example shown in FIG. 5B, as the antennas 3 and 4, antennas of directivity patterns having high receiving sensitivity with respect to radio waves from the left and right directions of the mobile telephone body 1 are used, so the antennas 3 and 4 are arranged such that the directivities thereof face left and right. However, the present invention is not limited to this configuration. If the directivity patterns of the antennas 3 and 4 are capable of covering front radio waves in addition to the left and right directions of the mobile telephone body 1, it may be arranged with the directivity facing the direction. Further, although dedicated antennas which are independent in the structures are used as the plural detection antennas 3 and 4, the present invention is not limited to this. The directivities as shown in FIG. 5B may be provided by using one dipole antenna as the plural detection antennas 3 and 4, and changing power supplying point to the dipole antenna in time sequence. Further, although the number of the detection antennas 3 and 4 are two, the number of the antennas is not limited to two, and may be more than two.

Now, the main receiving unit which receives incoming signals from the base station via the main antennae provided in the portable terminal, consists of the transceiving unit 9. The sub receiving units which receives incoming signals from the base station via plural detection antennas, provided in the portable terminal, consist of the receiving units 10 and 11. The detection unit which detects the arriving direction of base station signals in the radio wave environment of the portable terminal, based on the receiving level information of the main antenna, the receiving level information of the detection antennas and the directivity information of the detection antennas, consists of the CPU 13. The notifying units which notify information about the arriving direction of base station signals detected by the detection unit consist of the display unit 5, the peripheral control unit 15, the vibrator 16, and the speaker 18. However, the display unit 5, the peripheral control unit 15, the vibrator 16 or the speaker 18 constituting the notifying unit may be used alone or used in combination appropriately.

Figure 6:
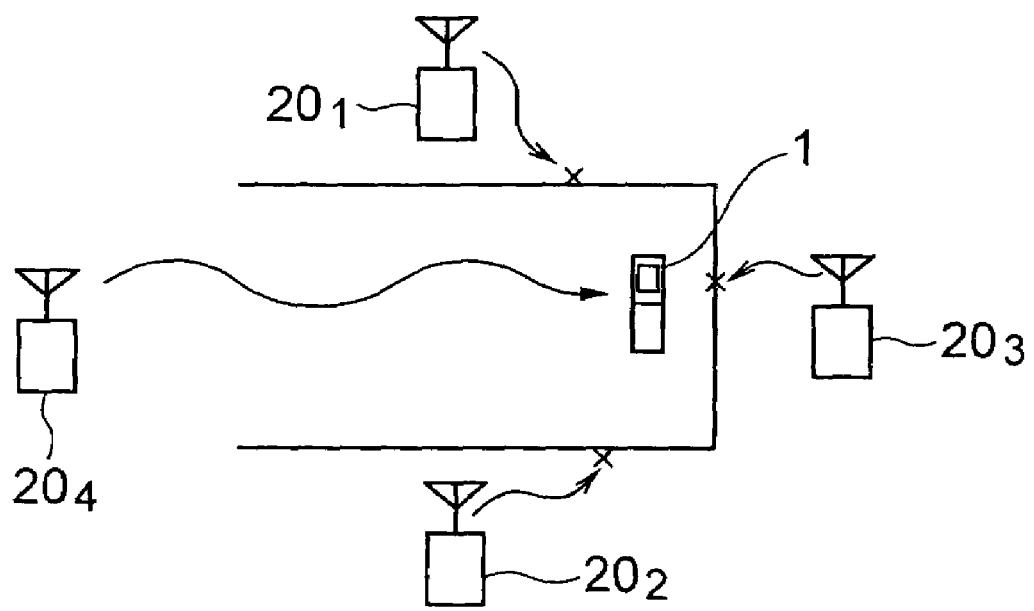
FIG. 6 is a diagram showing a case where the radio wave environment is in a deadlock.

Next, operation of the present embodiment according to the present invention will be explained. When a user 21 takes a communicating position for calling, creating an e-mail or the like in using the mobile telephone, the user 21 is likely to operate while holding the case 1b of the mobile telephone body 1 as shown in FIG. 5A. Therefore, the antenna 2 incorporated in the case 1b of the mobile telephone body 1 is likely to be covered with a hand of the user 21, whereby the antenna characteristics is subject to deterioration. Further, as shown in FIG. 6, there is a case in which the radio wave environment is in a deadlock, depending on the place where the mobile telephone is used. Places where the radio wave environment is in a deadlock include streets surrounded by high buildings and underground malls.

As described above, the radio wave environment of a mobile telephone changes depending on the way of holding the mobile telephone, the used state and the like, so communications are not always performed in the original communication quality. In view of the fact, the present invention is to make the communication quality close to the original communication quality, and to perform communications while keeping the communication quality as high as possible even in a case of the radio wave environment being in a deadlock.

Considering the case of the radio wave environment being in a deadlock as shown in FIG. 6, there is a case where the receiving sensitivity of an antenna is reduced with respect to radio waves from base stations $20_1$, $20_2$ and $20_3$ where the radio wave environment is in a deadlock, among a plurality of base stations $20_1$ to $20_4$, or radio waves from the base stations $20_1$, $20_2$ and $20_3$ do not reach the mobile telephone depending on the direction of the mobile telephone body 1.

On the other hand, radio waves from the base station $20_4$, located in a direction where the radio wave environment is not in a deadlock, are received by the main antenna 2 without being deteriorated since there is no obstruction to the radio waves in the way. Therefore, even when the radio wave environment is in a deadlock, radio waves from the base station $20_4$ may be received by the main antenna 2 of the mobile telephone. However, in a place where the radio wave environment is in a deadlock, it is impossible for the user to know the arriving direction of the radio waves from the base station $20_4$. In view of this, in the present invention, the mobile telephone detects the direction of the base station $20_4$ where the radio wave environment is good, and notifies the user of it.

Before the mobile telephone is shipped from the factory, required threshold information is stored on the memory 14 of the mobile telephone. The threshold information includes a notification threshold T1 and a detection threshold T2. The notification threshold T1 is threshold information for switching between the state of displaying the electric field level of signals from the base station and the state of notifying information about the arriving direction of base station signals. The detection threshold T2 is threshold information serving as the criteria for comparing with differential information in which the receiving level of the main antenna 2 is lowered with respect to the receiving levels of the detection antennas 3 and 4. As shown in FIG. 4C, the relationship between the notification threshold T1 and the detection threshold T2 is set to have a relationship of T1>T2. Further, as shown in FIG. 5B, such information that the direction of the directivity of one detection antenna 3 is a left direction of the mobile telephone body 1 and the direction of the directivity of the other detection antenna 4 is a right direction of the mobile telephone body 1 is stored in the memory 14. Note that information indicating the directions of the directivities of the detection antennas 3 and 4 is not limited to the information described above.

First, radio waves from an arbitrary base station are received by the main antenna 2 of the mobile telephone body 1. In this case, the changeover switch 22 connects the transceiving unit 9 and the baseband LSI 12 based on an instruction from the CPU 13.

The baseband LSI 12 demodulates the received signals received by the main antenna 2, and outputs the demodulated signals to the memory 14 under the control of the CPU 13. The memory 14 stores information relating to the demodulated signals. The CPU 13 reads out information of the notification threshold T1 stored on the memory 14, and also reads out the information of the demodulated signals which have been received by the main antenna 2 and demodulated, and compares the information of the demodulated signals with the notification threshold T1, and determines whether the receiving sensitivity of the main antenna 2 is not less than the notification threshold T1 (step S1 in FIG. 3).

Figure 1B:
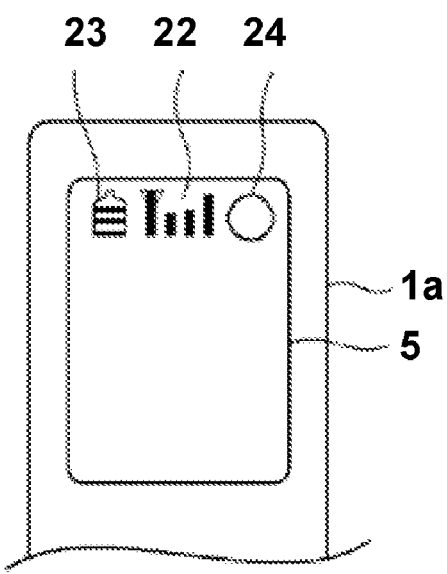
FIG. 1B is a diagram showing a display by a display unit.

If the receiving level (sensitivity) 2*a* of the main antenna 2 is not less than the notification threshold T1 shown as C1 in FIG. 4C (YES in step S1 in FIG. 3), the CPU 13 determines that the receiving sensitivity of the main antenna 2 is fine, and notifies the changeover switch 22 that a state of connecting the transceiving unit 9 and the baseband LSI 12 should be maintained. In this case, the display unit 5 displays the electric field level 22 of the base station signals under the control of the CPU 13, as shown in FIG. 1B.

Figure 3:
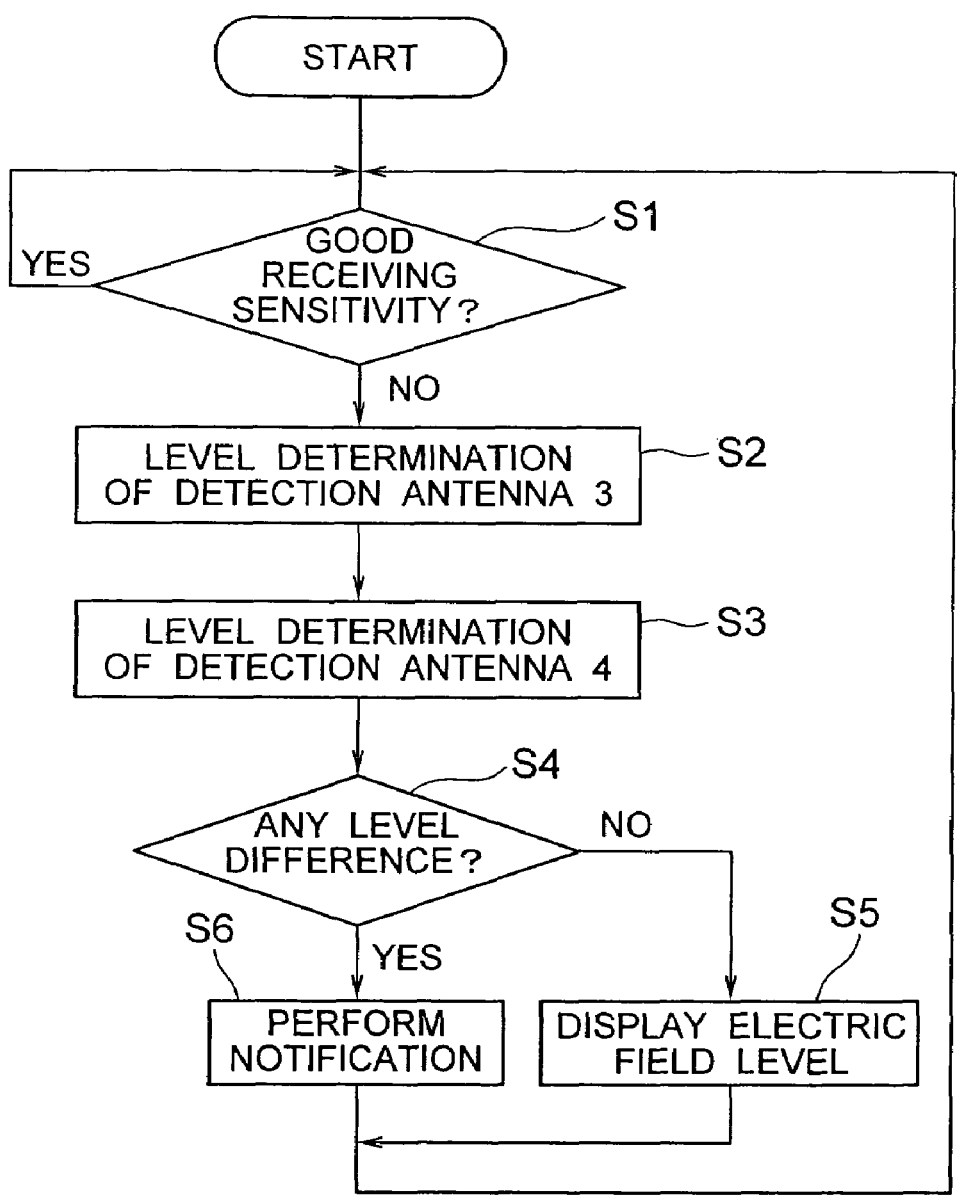
FIG. 3 is a flowchart showing the operation of a portable terminal according to the present invention.

In the state where the radio wave environment is in a deadlock as shown in FIG. 6, when the main antenna 2 receives radio waves from the base stations $20_1$, $20_2$ and $20_3$, the receiving level (sensitivity) 2*a'* is lowered than the notification threshold T1 as shown in C2 in FIG. 4C (No in step S1 in FIG. 3). Therefore, the CPU 13 notifies the changeover switch 22 of an instruction for switching the main antenna 2 to the detection antenna 3.

When the changeover switch 22 receives the instruction of switching the antenna from the CPU 13, the changeover switch connects the receiving unit 10 to the baseband LSI 12 instead of the transceiving unit 9 in order to switch receiving by the main antenna 2 to receiving by the detection antenna 3.

When antenna switching is performed, the detection antenna 3 receives radio waves from the base station. The receiving unit 10 outputs the received signals of the detection antenna 3 to the baseband LSI 12. The baseband LSI 12 demodulates the received signals from the receiving unit 10, and outputs the demodulated signals to the memory 14 under the control of the CPU 13. The memory 14 stores information relating to the demodulated signals.

The CPU 13 reads out the information about the receiving level 2*a'* of the received signals (demodulated signals) by the main antenna 2 stored on the memory 14, and the information about the receiving level 4*a* of the received signals (demodulated signals) by the detection antenna 3. Differential information D1 in which the receiving level 2*a'* of the main antenna 2 is lowered with respect to the receiving level 3*a* of the detection antenna 3 is computed (FIG. 4A), and determination of the receiving level is performed (step S2 in FIG. 3). The determination of the receiving level will be explained later together with determination of the receiving level of the other detection antenna 4.

Upon completion of the determination of the receiving level of the detection antenna 3, the CPU 13 outputs an instruction of antenna switching to the changeover switch 22 so as to switch from reception by the detection antenna 3 to reception by the detection antenna 4.

When the changeover switch 22 receives an instruction of antenna switching from the CPU 13, the changeover switch 22 connects the other receiving unit 11 to the baseband LSI 12 instead of the one receiving unit 10, in order to switch from reception by the one detection antenna 3 to reception by the other detection antenna 4.

When the antenna switching is performed, the detection antenna 4 receives radio waves from the base station instead of the antenna 3. The receiving unit 11 outputs the received signals of the detection antenna 4 to the baseband LSI 12. The baseband LSI 12 demodulates the received signals from the receiving unit 11, and outputs the demodulated signals to the memory 14 under the control of the CPU 13. The memory 14 stores information about the demodulated signals.

The CPU 13 reads out information about the receiving level 2*a'* of the received signals (demodulated signals) by the main antenna 2 stored on the memory 14 and information about the receiving level 4*a* of the received signals (demodulated signals) by the detection antenna 4, and computes differential information D2 in which the receiving level 2*a'* of the main antenna 2 is lowered with respect to the receiving level 4*a* of the detection antenna 4 (FIG. 4B), and determines the receiving level (step S3 in FIG. 3).

Next, explanation will be given for processing of receiving level determination of the detection antennas 3 and 4 by the CPU 13. As an example, a case in which the user 21 holds the case 1*b* of the mobile telephone body 1 with the right hand and starts communications in the direction of the mobile telephone shown in FIG. 6 will be explained.

In this example, the mobile telephone is in a state where radio waves from the base station $20_4$ shown in FIG. 6 can be received by the detection antenna 3 without being affected by radio wave disturbance. Further, although the main antenna 2 incorporated in the mobile telephone body 1 is covered with the right hand, reception is in the fine condition with respect to the radio wave from the base station $20_4$.

In step S2 in FIG. 3, the CPU 13 reads out the information (receiving level 2*a'*) about the received signals (demodulated signals) by the main antenna 2 and the information (receiving level 3*a*) about the received signals (demodulated signals) by the detection antenna 3 stored on the memory 14, and computes differential information D1 in which the receiving level 2*a'* of the main antenna 2 is lowered with respect to the receiving level 3*a* of the detection antenna 3. If there is a difference, the CPU 13 determines that radio wave disturbance such as a hand of the user 21 exists with respect to the main antenna 2.

In step S3 in FIG. 3, the CPU 13 reads out the information (receiving level 2*a'*) about the received signals (demodulated signals) by the main antenna 2 and the information (receiving level 4*a*) about the received signals (demodulated signals) by the detection antenna 4 stored on the memory 14, and computes differential information D2 in which the receiving level 2*a'* of the main antenna 2 is lowered with respect to the receiving level 4*a* of the detection antenna 4. If there is a difference, the CPU 13 determines that radio wave disturbance such as a hand of the user 21 exists with respect to the main antenna 2.

In step S2 in FIG. 3, after computing the differential information D1, the CPU 13 reads out the information about the detection threshold T2 stored on the memory 14. The CPU 13 compares the readout detection threshold T2 with the differential information D1, and if the differential information D1 is smaller than the detection threshold T2 (C4 in FIG. 4C), the CPU 13 determines that the receiving level of the main antenna 2 is lowered.

Figure 4A:
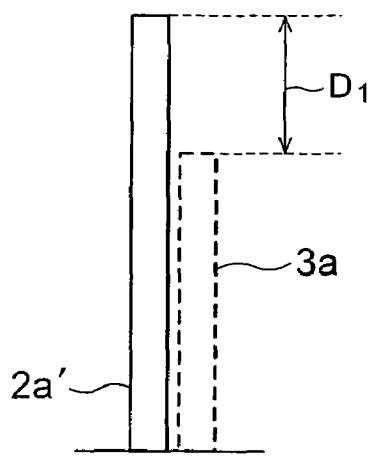
FIGS. 4A and 4B are diagrams showing fluctuations in the receiving levels of a main antenna and a detection antenna.
Figure 4B:
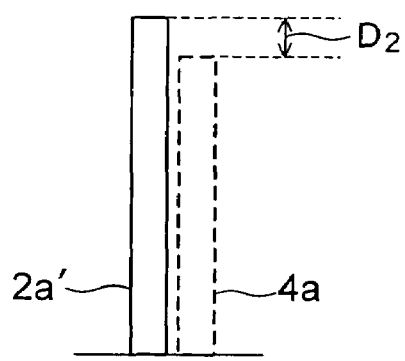
Figure 4C:
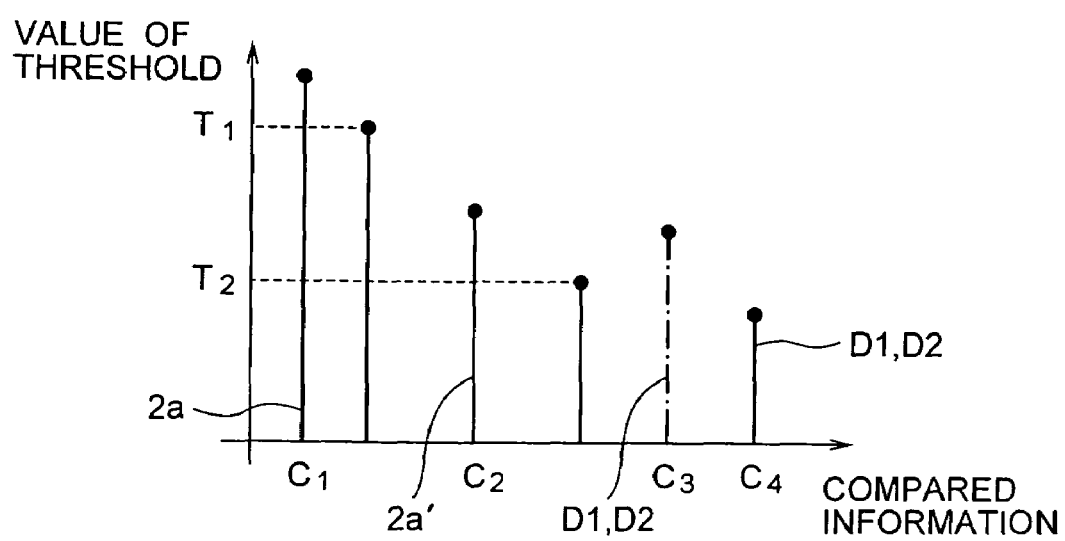
FIG. 4C is a chart showing the relationship between thresholds and information stored on a memory.

In the example shown in FIG. 6, the differential information D1 computed in step S2 in FIG. 3 is large as shown in FIG. 4A, and the differential information D2 computed in step S3 in FIG. 3 is small as shown in FIG. 4B. In FIGS. 4A and 4B, the receiving level 2*a'* of the main antenna 2 is shown by the solid lines, and the receiving levels 3*a* and 4*a* of the detection antennas 3 and 4 are shown by the broken lines.

In step S3 in FIG. 3, after computing the differential information D1 and the differential information D2, the CPU 13 reads out the information about the detection threshold T2 stored on the memory 14. The CPU 13 compares the readout detection threshold T2 with the differential information D1 and with the differential information D2, respectively (step S4 in FIG. 3).

As a result of comparing the detection threshold T2 with the differential information D1 and with the differential information D2, if the differential information D1 and the differential information D2 are larger than the detection threshold T2 (NO in step S4 in FIG. 3, C3 in FIG. 4(C)), the CPU 13 determines that it is not required to notify the user 21 of information about the arriving direction of base station signals. In this case, the receiving level 2a' of the main antenna 2 is lower than the threshold T1 certainly, and the communication quality is degraded from the set quality. However, the degrade is not a level causing disturbance such as an error in communication data, so the CPU 13 determines that there is no need to notify the user 21 of the information about the arriving direction of the base station signals. Then, the CPU 13 outputs an instruction for displaying the electric field level of the base station signals by the main antenna 2 to the display unit 5. The display unit 5 receives an electric field level display instruction from the CPU 13, and performs the electric field level display 22 as shown in FIG. 1B (step S5 in FIG. 3). Note that the reference numeral 23 displayed on the display unit 5 in FIG. 1B is a display showing the remaining amount of the battery.

As a result of comparing the detection threshold T2 with the differential information D1 and with the differential information D2, if the differential information D1 and the differential information D2 are smaller than the detection threshold T2 (YES in step S4 in FIG. 3, C4 in FIG. 4C), the CPU 13 determines that it is required to notify information of the arriving direction of the base station signals to the user 21. Further, the CPU 13 reads out the directional information of the directivities of the detection antennas stored on the memory 14. Then, the CPU 13 specifies the arriving direction of the base station signals based on the direction information of the readout antenna directivity.

In the case of FIG. 4A, the lowering rate of the receiving level 2a' of the main antenna 2 with respect to the detection antenna 3 is small, and in the case of FIG. 4B, the lowering rate of the receiving level 2a' of the main antenna 2 with respect to the detection antenna 4 is large. Therefore, based on the differential information D1 and D2 computed in steps S2 and S3, information that the direction of the directivity of the detection antenna 3 is a left direction of the mobile telephone body 1, and information that the direction of the directivity of the other direction antenna 4 is a right direction of the mobile telephone body 1, the CPU 13 determines that the arriving direction of base station signals that the main antenna 2 can receive without lowering the receiving sensitivity is a left direction of the mobile telephone body 1 shown in FIG. 6. The CPU 13 causes the memory 14 to store the determination result.

Then, CPU 13 outputs information about the arriving direction of base station signals to the display unit 5 and to the peripheral control unit 15. With the information from the CPU 13, the display unit 5 displays the information 24 about the arriving direction of the base station signals. With the information from the CPU 13, the peripheral control unit 15 outputs notification signals to the vibrator 16 and to the speaker 17. When the vibrator 16 receives the notification signal from the peripheral control device 15, it vibrates the mobile telephone body 1. When the speaker 17 receives the notification signal from the peripheral control device 15, it generates voice for notification.

The user 21 understands that the direction of the mobile telephone, that is, the direction of the main antenna 2, with respect to signals transmitted from the base station must be changed, based on the display of the information 24 on the display unit 5, vibration by the vibrator 16, and voice from the speaker 17. As shown in FIG. 5, the user 21 turns around so as to change the direction of the mobile telephone to thereby change the direction of the main antenna 2 with respect to the base station.

Even in the process that the user 21 changes the direction of the mobile telephone, the CPU 13 performs processing shown in FIG. 3. At the point where the direction of the main antenna 2 incorporated in the mobile telephone body 1 is adapted to the radio wave arriving direction from the base station $20_4$ shown in FIG. 6, output of the signals to the display unit 5 and the peripheral control unit 15 is stopped.

The user 21 performs communications with the base station $20_4$ shown in FIG. 6 at a position where the display of the information 24 on the display unit 5, the vibration by the vibrator 16 or the voice from the speaker 17 stops.

In this case, the CPU 13 may output receiving level information of the main antenna 2 to the display unit 5 and the peripheral control unit 15 in addition to the arriving direction information of base station signals. With the display unit 5, the vibrator 16 and the speaker 17 performing notification while taking into account the receiving level information outputted additionally from the peripheral control unit 15, the user 21 can recognize the degree that the direction of the mobile telephone body 1 has been changed based on the notification information.

In the embodiment described above, the changeover switch 22 switches between the main antenna 2 and the detection antennas 3 and 4 so as to determine the receiving level of the main antenna 2, but it is not limited to this configuration. The configuration may be changed as shown in FIGS. 7 and 8.

Figure 7:
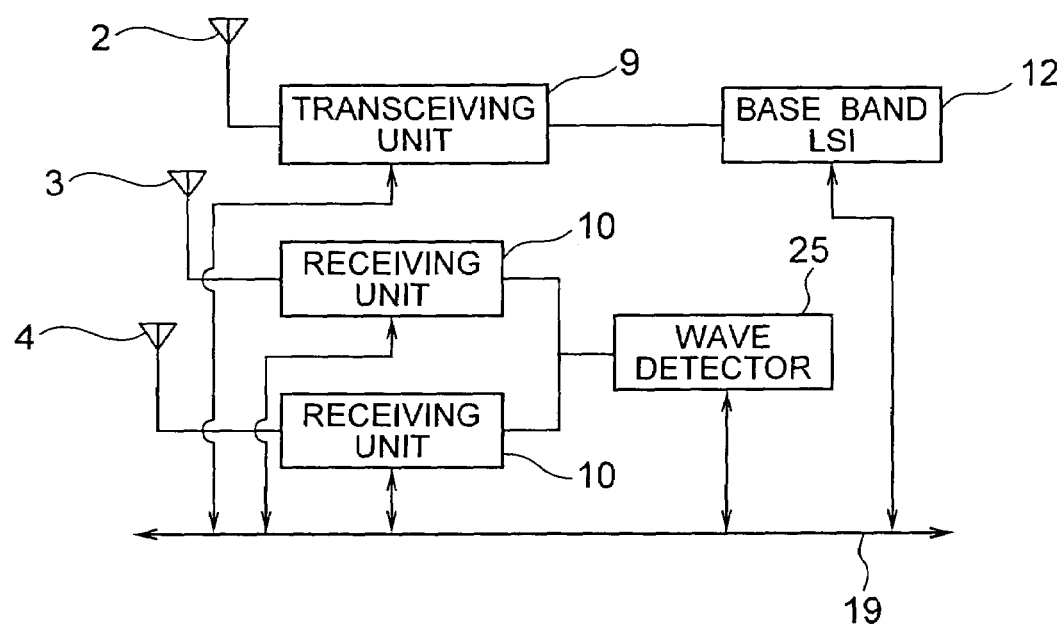
FIG. 7 is a block diagram showing the configuration of a portable terminal according to another embodiment of the present invention.

In an embodiment shown in FIG. 7, the main antenna 2 is connected to the transceiving unit 9 which is connected directly to the baseband LSI 12. The baseband LSI 12 demodulates received signals from the transceiving unit 9, and outputs the demodulated signals to the memory 14. The memory 14 stores the demodulated signals from the baseband LSI 12. Further, each of the two detection antennas 3 and 4 are connected to each of the receiving units 10 and 11, respectively. Then, the two receiving units 10 and 11 are connected to a wave detector 25. The wave detector 25 demodulates received signals from the receiving units 10 and 11, and outputs the demodulated signals to the memory 14 under the control of the CPU 13. The memory 14 stores demodulated signals from the wave detector 25.

The CPU 13 reads out information stored on the memory 14 and monitors the receiving level in the same manner as that of the embodiment described above.

Figure 8:
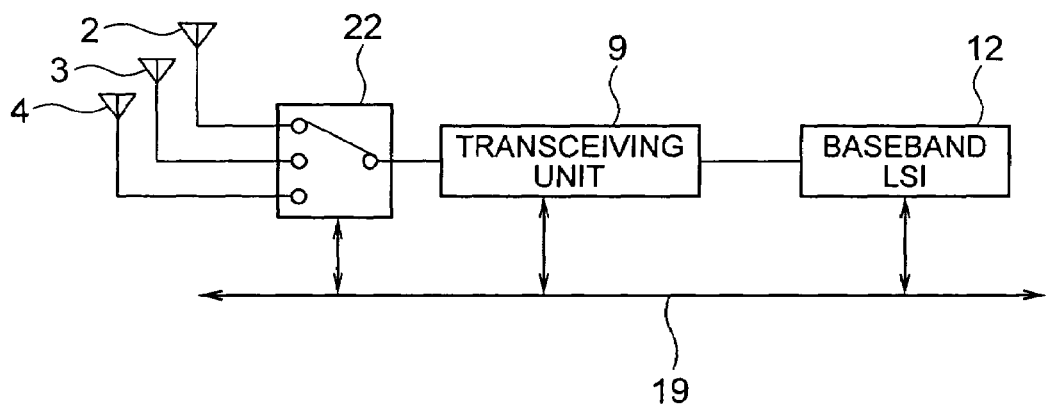
FIG. 8 is a block diagram showing the configuration of a portable terminal according to another embodiment of the present invention.

In an embodiment shown in FIG. 8, the main antenna 2 or the detection antenna 3 or 4 are selectively connected to one transceiving unit 9 by the changeover switch 22. The transceiving unit 9 is connected directly to the baseband LSI 12. The baseband LSI 12 demodulates received signals from the main antenna 2 and the detection antennas 3 and 4 outputted from the transceiving unit 9, and outputs the demodulated signals to the memory 14. The memory 14 stores the demodulated signals from the baseband LSI 12.

Then, the CPU 13 reads out the information stored on the memory 14, and monitors the receiving level in the same manner as that of the embodiment described above.

In the embodiment shown in FIG. 8, the main receiving unit and the sub receiving unit consist of the transceiving unit 9.

In the embodiment shown in FIG. 8, the transceiving unit 9 is commonly used for the three antennas 2, 3 and 4. Therefore, the number of receiving units can be reduced, so the size of the mobile telephone body 1 can be reduced easily.

INDUSTRIAL AVAILABILITY

As described above, according to the present invention, the level of the receiving sensitivity in detection antennas is determined, and when the communication quality is deteriorated, it is possible to notify a user before performing the communications so as to notify the user of changing the direction of the mobile telephone.

Upon receipt of the notification from the mobile telephone, the user can change the direction of the mobile telephone to a direction in which radio waves arrive finely, whereby the user can perform communications while keeping the receiving sensitivity in the main antenna in a good condition. Therefore, even in a case where the radio wave environment is in a deadlock, communications can be performed while keeping the communication quality.

What is claimed is:

1. A portable terminal, comprising:
a main receiving unit for receiving an incoming signal from a base station via a main antenna provided in the portable terminal;
a sub receiving unit for receiving an incoming signal from the base station via a plurality of detection antennas provided in the portable terminal;
a detection unit for detecting an arriving direction of a base station signal in a radio wave environment of the portable terminal, based on receiving level information of the main antenna, on receiving level information of the detection antennas, and on directivity information of the detection antennas; and
a notifying unit for notifying information about the arriving direction of the base station signal detected by the detection unit;
wherein the detection unit detects the arriving direction of the base station signal in the radio wave environment of the portable terminal, based on differential information in which a receiving level of the main antenna is lowered with respect to a receiving level of the detection antennas, and on the directivity information of the detection antennas.

2. The portable terminal, as claimed in claim 1, wherein when the differential information is not more than a threshold, the notifying unit notifies the information about the arriving direction of the base station signal together with the receiving level information.

3. The portable terminal, as claimed in claim 2, wherein when the differential information is not less than a threshold, the notifying unit displays an electric field level of the base station signal instead of the notification.

4. The portable terminal, as claimed in claim 1, wherein the notifying unit notifies the information by vibrating a portable terminal body.

5. The portable terminal, as claimed in claim 1, wherein the notifying unit notifies the information as audio information.

6. The portable terminal, as claimed in claim 1, wherein the notifying unit notifies the information as visual information.

7. The portable terminal, as claimed in claim 1, wherein the plurality of detection antennas are arranged such that directions of directivities thereof are differed.

8. A portable terminal communication method comprising:
a main receiving step in which an incoming signal from a base station is received by a main antenna provided in a portable terminal;
a sub receiving step in which an incoming signal from a base station is received by a plurality of detection antennas provided in the portable terminal;
a detection step in which an arriving direction of a base station signal in a radio wave environment of the portable terminal is detected based on receiving level information of the main antenna, on receiving level information of the detection antennas and on directivity information of the detection antennas; and
a notifying step in which information about the arriving direction of the base station signal detected in the detection step is notified;
wherein in the detection step, the arriving direction of the base station signal in a radio wave environment of the portable terminal is detected based on differential information in which a receiving level of the main antenna is lowered with respect to a receiving level of the detection antenna, and on directivity information of the direction antennas.

9. The portable terminal communication method, as claimed in claim 8, wherein in the notifying step, if the differential information is not more than a threshold, the information about the arriving direction of the base station signal is notified together with the receiving level information.

10. The portable terminal communication method, as claimed in claim 9, wherein if the differential information is not less than the threshold, an electric field level of the base station signal is displayed instead of the notification.

* * * * *